(12) United States Patent
Li (10) Patent No.: US 11,379,989 B2
(45) Date of Patent: Jul. 5, 2022

(54) METHOD AND DEVICE OF EXTRACTING LABEL IN MEDICAL IMAGE

(71) Applicant: BOE TECHNOLOGY GROUP CO., LTD., Beijing (CN)

(72) Inventor: Yingying Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 268 days.

(21) Appl. No.: 16/623,527

(22) PCT Filed: Jun. 3, 2019

(86) PCT No.: PCT/CN2019/089765
§ 371 (c)(1),
(2) Date: Dec. 17, 2019

(87) PCT Pub. No.: WO2020/001236
PCT Pub. Date: Jan. 2, 2020

(65) Prior Publication Data
US 2021/0407097 A1    Dec. 30, 2021

(30) Foreign Application Priority Data
Jun. 28, 2018 (CN) .......................... 201810687804.1

(51) Int. Cl.
*G06T 7/13* (2017.01)
*G06T 7/136* (2017.01)
(Continued)

(52) U.S. Cl.
CPC .................. *G06T 7/13* (2017.01); *G06T 5/30* (2013.01); *G06T 7/0012* (2013.01); *G06T 7/136* (2017.01);
(Continued)

(58) Field of Classification Search
CPC .......... G06T 7/13; G06T 5/30; G06T 7/0012; G06T 7/136; G06T 7/62; G06T 7/90;
(Continued)

(56) References Cited

U.S. PATENT DOCUMENTS

2012/0230564 A1* 9/2012 Liu ...................... A61B 5/7275
382/128
2016/0284103 A1* 9/2016 Huang .................. G06T 7/0012

FOREIGN PATENT DOCUMENTS

CN    103310215 A    9/2013
CN    106204544 A    12/2016
(Continued)

OTHER PUBLICATIONS

First Office Action for Chinese Application No. 201810687804.1, dated Apr. 24, 2020, 10 Pages.
(Continued)

*Primary Examiner* — Jon Chang
(74) *Attorney, Agent, or Firm* — Brooks Kushman P.C.

(57) ABSTRACT

A method and a device of extracting a label in a medical image are provided. The method includes: performing an edge detection on the medical image by using an edge detection algorithm, to acquire edge information in the medical image; determining at least one target area defined by the edge information; performing a fitting process on the at least one target area, to obtain a fitting area; and extracting the label in the medical image by selecting, from the fitting areas, at least one target fitting area matching a preset condition, wherein the preset condition is set based on a characteristic of the fitting area.

17 Claims, 3 Drawing Sheets

(51) Int. Cl.
*G06T 7/90* (2017.01)
*G06T 5/30* (2006.01)
*G06T 7/00* (2017.01)
*G06T 7/62* (2017.01)

(52) U.S. Cl.
CPC .................. *G06T 7/62* (2017.01); *G06T 7/90* (2017.01); *G06T 2207/30041* (2013.01); *G06T 2207/30096* (2013.01)

(58) Field of Classification Search
CPC . G06T 2207/30041; G06T 2207/30096; G06T 7/187; G06T 2207/10004
See application file for complete search history.

(56) References Cited

FOREIGN PATENT DOCUMENTS

| | | |
|---|---|---|
| CN | 106650596 A | 5/2017 |
| CN | 107578051 A | 1/2018 |
| CN | 108921836 A | 11/2018 |

OTHER PUBLICATIONS

International Search Report and Written Opinion for Application No. PCT/CN2019/089765, dated Sep. 9, 2019, 10 Pages.

\* cited by examiner

METHOD AND DEVICE OF EXTRACTING LABEL IN MEDICAL IMAGE

CROSS-REFERENCE TO RELATED APPLICATIONS

This application is the U.S. national phase of PCT Application No. PCT/CN2019/089765 filed on Jun. 3, 2019, which claims priority to Chinese Patent Application No. 201810687804.1 filed on Jun. 28, 2018, which are incorporated herein by reference in their entireties.

TECHNICAL FIELD

The present disclosure relates to the field of image processing, in particular to a method and a device of extracting a label in a medical image.

BACKGROUND

Medical imaging plays instrumental roles in the medical field. For example, doctors may perform pathologic analysis, pathologic diagnosis, etc. with the aid of medical images. However, currently in most hospitals, labeling of lesion sites in medical images entails manual additions of labels by doctors in the medical images. Only a professional medical staff is capable of analyzing the medical images obtained in this way for the purpose of diagnosis. For those with less medical experiences, it's impossible to perform pathologic analysis, pathologic diagnosis, etc. with merely a medical image.

SUMMARY

In a first aspect, embodiments of the present disclosure provide a method of extracting a label in a medical image. The method includes: performing an edge detection on the medical image by using an edge detection algorithm, to acquire edge information in the medical image; determining at least one target area defined by the edge information; performing a fitting process on the determined at least one target area, to obtain a fitting area; and extracting the label in the medical image by selecting, from the fitting areas, at least one target fitting area matching a preset condition, wherein the preset condition is set based on a characteristic of the fitting area.

Optionally, before the performing the edge detection on the medical image by using the edge detection algorithm, the method further includes: filtering the medical image, to obtain a filtered medical image. The edge detection is performed on the filtered medical image.

Optionally, the determining the at least one target area defined by the edge information includes: dilating the at least one area defined by the edge information, and determining the dilated at least one area as the at least one target area.

Optionally, the medical image is an eye fundus image, and the edge detection algorithm employs two thresholds for detection.

Optionally, the two thresholds include a first set threshold of 80 and a second set threshold of 150.

Optionally, performing the fitting process on the determined at least one target area includes: sorting the at least one target area into categories corresponding to different lesion types in the medical image; and performing the fitting process on the at least one target area of a same category, to obtain the fitting area of the category.

Optionally, lesions of different natures are labeled with different colors in the medical image. The sorting the target areas into categories further includes: acquiring a color characteristic corresponding to the edge information of each of the at least one target area; and sorting the at least one target area into the categories based on the color characteristic.

Optionally, a lesion in the medical image is labeled with an ellipse. The edge information includes edge coordinate information, and performing the fitting process on the determined at least one target area includes: performing an ellipse fitting process on the edge coordinate information of the determined at least one target area, to obtain the fitting area.

Optionally, the preset condition is based on at least one of: a preset value of a long radius/short radius ratio of the fitting area; a preset value of an area/perimeter ratio of the fitting area; and the fitting area not being a nested fitting area.

In a second aspect, embodiments of the present disclosure further provide a device of extracting a label in a medical image. The device includes: an edge information acquisition circuit, configured to perform an edge detection on the medical image by using an edge detection algorithm, to acquire edge information in the medical image; a target area determination circuit, configured to determine at least one target area defined by the edge information; a fitting circuit, configured to perform a fitting process on the determined at least one target area, to obtain a fitting area; and an extraction circuit, configured to extract the label in the medical image by selecting, from the fitting areas, at least one target fitting area matching a preset condition, wherein the preset condition is set based on a characteristic of the fitting area.

Optionally, the device further includes: a filtering circuit, configured to filter the medical image, to obtain a filtered medical image. The edge information acquisition circuit is configured to perform the edge detection on the filtered medical image.

Optionally, the target area determination circuit is further configured to dilate the at least one area defined by the edge information, and determine the dilated at least one area as the at least one target area.

Optionally, the medical image is an eye fundus image. The edge information acquisition circuit is configured to employ two thresholds to perform the edge detection.

Optionally, the two thresholds include a first set threshold of 80 and a second set threshold of 150.

Optionally, the fitting circuit further includes: a sorting sub-circuit, configured to sort, based on the edge information, the at least one target area into categories corresponding to different lesion types in the medical image. The fitting circuit is further configured to perform the fitting process on at least one target area of a same category, to obtain the fitting area of the category.

Optionally, different types of lesions are labeled with different colors in the medical image, and the sorting sub-circuit is further configured to acquire color characteristic corresponding to the edge information of each of the at least one target area, and sort the at least one target area into the categories based on the color characteristic.

Optionally, a lesion in the medical image is labeled with an ellipse. The edge information includes edge coordinate information. The fitting circuit is configured to perform an ellipse fitting process on the edge coordinate information of the determined at least one target area, to obtain the fitting area.

In a third aspect, embodiments of the present disclosure further provide a storage medium storing therein computer instructions. The computer instructions are configured to be executed by a processor, to implement steps of the foregoing method.

In a fourth aspect, the present disclosure further provides a computer equipment, including a memory, a processor and computer instructions stored in the memory. The processor is configured to execute the computer instructions, to implement steps of the foregoing method.

DETAILED DESCRIPTION

To make the foregoing objective, characteristics, and advantages of the present disclosure more clear, detailed descriptions of the present disclosure are provided hereinafter with reference to the accompanying drawings and specific embodiments.

The present disclosure provides a method and a device of extracting a label in a medical image. The labeled areas extracted from the medical image are applicable to subsequent machine learning, to serve the purpose of detecting/analyzing lesions.

Figure 1:
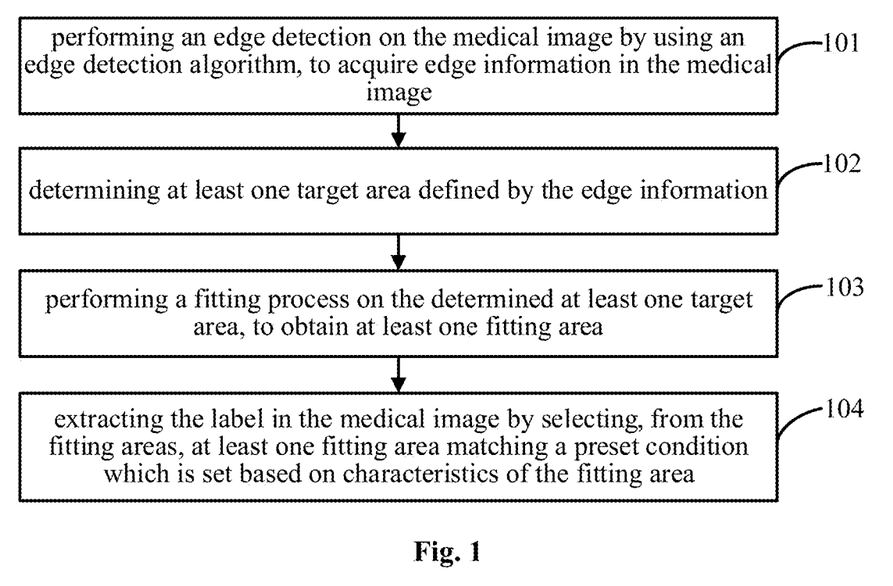
FIG. 1 illustrates a flow diagram of a method of extracting a label in a medical image provided by embodiments of the present disclosure.

FIG. 1 illustrates a flow diagram of a method of extracting a label in a medical image provided by embodiments of the present disclosure.

A step 101 includes: performing an edge detection on the medical image by using an edge detection algorithm, to acquire edge information in the medical image.

A medical image may be an image reflecting structure, density and the like of tissues and organs in human body that is acquired by using medical equipment based on an interaction between certain medium (such as X ray, electromagnetic field, ultrasonic wave) and human body, and is labeled at a lesion site (e.g., a nidus) in the image by a professional medical staff.

Figure 2A:
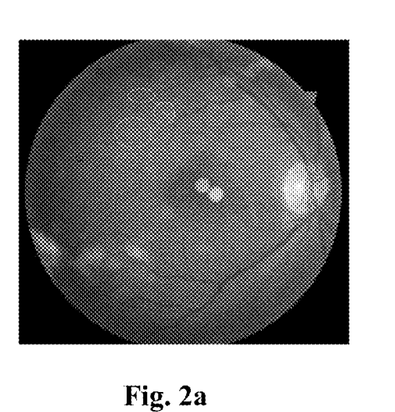
FIG. 2a illustrates a schematic diagram of an eye fundus medical image provided by embodiments of the present disclosure.

FIG. 2a illustrates a schematic diagram of an eye fundus medical image. As shown in FIG. 2a, the positions in the eye fundus medical image that are encircled by ellipses are areas labeled by a doctor. These labeled areas are also known as target areas, which are areas to be extracted according to the embodiments of the present disclosure.

An edge in the image refers to portions of the image where significant changes of brightness of a local area occurs. The grayscale profile in the area may generally be considered as a step change, i.e., the profile changes drastically from a grayscale value to another greatly different grayscale value within a very small buffer area. By performing an edge detection on the medical image using an edge detection algorithm, edge information, such as coordinates of edge, of the portions in the medical image where significant changes of brightness of the local area occur may be acquired. In accordance with the edge information, at least one target area may be defined. For example, in the eye fundus medical image as shown in FIG. 2a, the portions encircled/labeled with ellipses are the target areas to be extracted. The edge information of the ellipses used for labeling may be acquired. A portion defined by the edge of an ellipse is the target area.

It should be understood that, the shape used in labeling is not limited to ellipse, but may include any other shape suitable for defining a certain area, including a regular shape (such as a circle, square or rhombus shape) or an irregular shape (for example, an irregular polygon or irregular curve).

In some embodiments, an edge detection may be performed on the medical image by using the Canny edge detection algorithm, to determine the edge information in the medical image. Two thresholds (e.g., a first set threshold and a second set threshold) may be used in the Canny edge detection algorithm to locate edge points in the medical image, and then edge information, such as border point coordinate information, of the medical image may be acquired according to the first set threshold and the second set threshold.

In general, a portion with high brightness gradient in an image is more likely to be the edge. However, since there is no exact value to define how great a brightness gradient suggests an edge, the Canny algorithm employs hysteresis thresholding. The hysteresis thresholding requires two thresholds: a high threshold and a low threshold. In this way, assuming that important edges in the image are all continuous curves, blurred portions of a given curve may be tracked, and noise pixels which do not form a curve may be excluded from the edge. Thus, the detection may start with a greater threshold value, which will identify a relatively reliable real edge. By using previously derived direction information and starting from these real edges, the entire edge is tracked in the image. During tracking, a small threshold value is used, so that the blurred portions of a curve may be tracked until returning to the starting point. Once the process is completed, a binary image is obtained, in which each pixel denotes whether it's an edge point.

In embodiments, when an edge detection is performed on the eye fundus medical image by using the Canny edge detection algorithm, setting a threshold to a too small value may invite too much information of optic disc and information of edge of eye ball, while setting a threshold to a too large value may risk losing information labeled by a doctor in the eye fundus medical image.

Figure 2B:
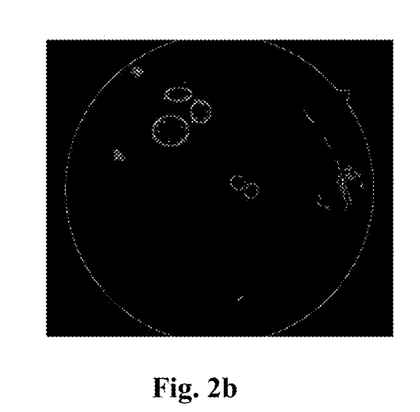
FIG. 2b illustrates a schematic diagram of defined edges of various target objects in the eye fundus medical image provided by embodiments of the present disclosure.

In an embodiment of the present disclosure, the lower one of the first and second set thresholds may be set to 80 and the higher one may be set to 150. For example, as for a smoothed image, a change gradient of grayscale intensity may be determined by using Sobel operator, with a kernel size of 3, so as to extract labels in the medical image, such as an ellipse label. FIG. 2b illustrates a schematic diagram of detected defined edges of various target objects in the eye fundus medical image. As shown in FIG. 2b, the portions encircled by ellipses are the elliptic areas labeled by doctor, namely, the sites where various eye fundus diseases may have occurred.

It should be understood that, the specific values of the first and second set thresholds may be determined by experimentation. The specific processes of experiments may adopt experiment methods commonly used by a person skilled in the art.

Optionally, before the step 101, the method may further include: filtering the medical image, to obtain a filtered medical image.

Since there are usually relatively large quantities of noises in the original image, it is necessary to filter the original data of the medical image. Optionally, the Gaussian filtering may be utilized to process the medical image. For example, a convolution operation of original medical image data with a Gaussian mask may be performed, to de-noise the medical image. For example, a process of Gaussian masking may be: img=cv2.GaussianBlur(bgr, (3, 3), 0).

By performing the edge detection on the filtered medical image, an inaccuracy in detection of elliptic labeled information in the eye fundus image may be avoided.

A step 102 includes: determining at least one target area defined by the edge information.

After the edge information in the medical image is acquired according to the first and second set thresholds, at least one target area defined by the edge information may be determined. For example, referring to FIG. 2b, after edge information is acquired from the eye fundus medical image of FIG. 2a, elliptic areas as shown in FIG. 2b, i.e., target areas defined by the edge information, may be acquired according to the edge information.

In an optional embodiment of the present disclosure, the step 102 may include: dilating at least one target area defined by the edge information, to expand the target areas.

In embodiments of the present disclosure, at least one target area defined by the edge information may be dilated, to expand the edges of the target areas, such that pits on the edges of the target areas or inside the target areas may be eliminated.

Figure 2C:
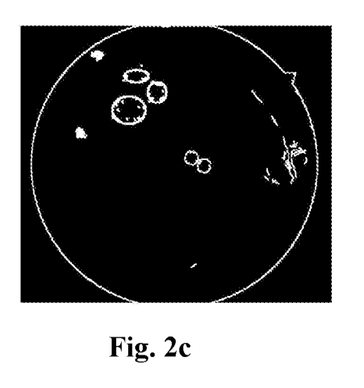
FIG. 2c illustrates a schematic diagram of the eye fundus medical image having been subjected to a dilation operation provided by embodiments of the present disclosure.

For example, the dilation operation may include a process as follows. First, the image as shown in FIG. 2b is convolved with a kernel B of any shape. The selected kernel B may be of square or circle shape (in embodiments of the present disclosure, a square-shaped kernel with a size of 3*3 is selected). The kernel B has a definable anchor point, which is usually defined as the center point of the kernel. When the dilation operation is performed, the kernel B is scanned through the image as shown in FIG. 2b. The maximum pixel value of a coverage area of the kernel B is extracted and assigned to the pixel at the anchor point. Apparently, such maximization operation would "expand" the bright areas in the image, resulting in the target areas whose edges are highlighted and expanded in range. For example, FIG. 2c illustrates a schematic diagram of the eye fundus medical image having been subjected to a dilation operation provided by embodiments of the present disclosure. As shown in FIG. 2b and FIG. 2c, after the dilation operation is performed on the target areas, the edges of the target areas are highlighted and expanded in range.

The code for the dilation operation may be as follows:
kernel1=cv2.getStructuringElement (cv2.MORPH_RECT,(3, 3))
dilated=cv2.dilate(canny, kernel1)

Figure 2D:
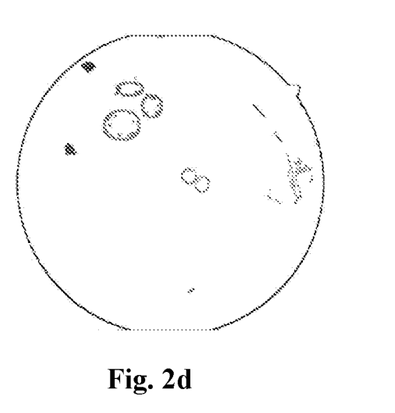
FIG. 2d illustrates a schematic diagram of target areas extracted from the eye fundus medical image provided by embodiments of the present disclosure.

FIG. 2d illustrates a schematic diagram of target areas extracted from the eye fundus medical image provided by embodiments of the present disclosure. After FIG. 2c is obtained, the encircled areas in FIG. 2c may be extracted to obtain an image including the target areas only.

A step 103 includes: performing a fitting process on the determined at least one target area, to obtain a fitting area. The coordinate of center point of the fitting area and edge coordinate information of the fitting area may be acquired, to extract coordinate information of the target area in the medical image for use in subsequent machine learning. In some embodiments, the target areas may be sorted into categories corresponding to different lesion types in the medical image. The fitting process is performed on at least one target area of a same category, to obtain a fitting area of the category.

In an optional embodiment of the present disclosure, prior to the step 103, the following steps may be included.

A step C1 includes: acquiring, based on the medical image, a color characteristic corresponding to the edge information of the at least one target area.

A step C2 includes: sorting the at least one target area based on the color characteristic, for example, sorting the first target areas with the same color characteristic into the same category.

Figure 2E:
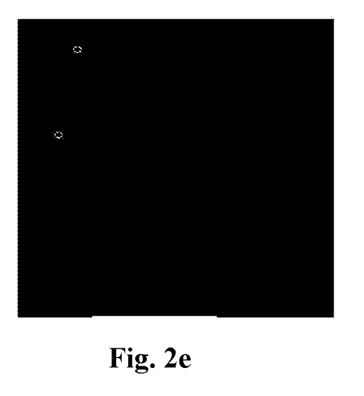
FIG. 2e illustrates a schematic diagram of different masks in the eye fundus medical image provided by embodiments of the present disclosure.
Figure 2F:
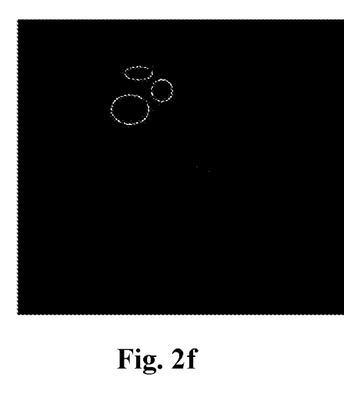
FIG. 2f illustrates a schematic diagram of different masks in the eye fundus medical image provided by embodiments of the present disclosure.

In embodiments of the present disclosure, lesions of different natures are labeled by a doctor with different colors in the medical image. Taking FIG. 2a for example, since there are two different types of lesions, the labels in the eye fundus medical image may be in two colors. As a result, the color characteristic may be selected as per actual need, and then color characteristics corresponding to the target areas may be acquired from the image to be detected according to the color. For each color, 4 to 8 representative pixel values may be extracted. For each pixel point in FIG. 2d, a Euclidean distance between the pixel point and each representative pixel value is calculated. If the Euclidean distance is less than a set threshold, the value of the pixel is set to (0, 0, 0), and if the Euclidean distance is greater than the threshold, the value of the pixel is set to (255, 255, 255). Therefore, masks for the elliptic labels corresponding to different lesions in the medical image are acquired, giving rise to the images as shown in FIG. 2e and FIG. 2f. For example, referring to FIG. 2e and FIG. 2f, schematic diagrams of different masks in the eye fundus medical image provided by embodiments of the present disclosure are illustrated. After a color extraction process is performed on FIG. 2d, different masks as shown in FIG. 2e and FIG. 2f may be obtained. After color characteristic of various target objects are extracted, the target objects with the same color characteristic may be sorted into the same category. For example, the labels in the eye fundus medical image 2a have two colors, namely, white and black. There are three white areas, which may be designated as a, b, c respectively. There are two black areas, which may be designated as e and d respectively. According to the color characteristic, a, b, c may be sorted into a same category, while e, d may be sorted into another category.

It should be understood that, the foregoing examples are given solely for achieving a better understanding of the technical solution of the embodiments of the present disclosure, and the embodiments of the present disclosure are by no means limited thereto. In practice, a person skilled in the art may sort the target areas by other means (for example, borderline width characterized by border information, and the like).

In another optional embodiment of the present disclosure, the step 103 may include performing the fitting process on the edge coordinate information of the target area by using an ellipse fitting method, to obtain the fitting area.

In embodiments of the present disclosure, since the labels added to the lesions in the medical image by the doctor are elliptic, the ellipse fitting may be employed.

The edge information of the target area may include edge coordinate information. The edge coordinate information of each target area constitutes a set of border pixel points of the target area. The fitting area resulting from the fitting process performed on the border pixel points in the border pixel point set by using the ellipse fitting method may include a center point coordinate of the fitting area.

Figure 2G:
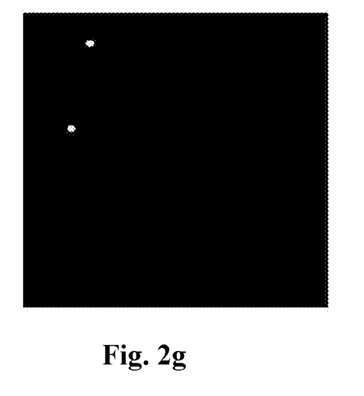
FIG. 2g illustrates a schematic diagram of the eye fundus medical image having been subjected to a fitting process provided by embodiments of the present disclosure.
Figure 2H:
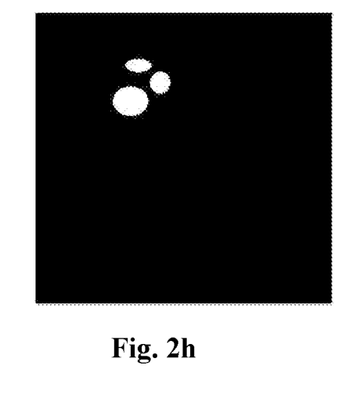
FIG. 2h illustrates a schematic diagram of the eye fundus medical image having been subjected to a fitting process provided by embodiments of the present disclosure.
Figure 2I:
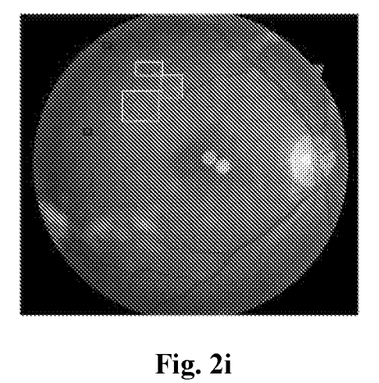
FIG. 2i illustrates a schematic diagram of the eye fundus medical image having been subjected to a fitting process provided by embodiments of the present disclosure.

A core concept of the ellipse fitting method lies in: for a group of sample points in a given plane, drawing an ellipse which is as close to these sample points as possible. In other words, a group of data in the medical image is fitted by using an elliptic equations as models, such that a certain elliptic equation meets these data to the greatest extent, and then the parameters of the elliptic equation are determined. The center of the determined best ellipse is determined to be the target. For example, FIG. 2g, FIG. 2h and FIG. 2i illustrate schematic diagrams of the eye fundus medical image having been subjected to a fitting process provided by embodiments of the present disclosure. A fitting process performed on the areas defined by ellipses in FIG. 2e may result in the fitting areas as shown in FIG. 2g. A fitting process performed on the areas defined by ellipses in FIG. 2f may result in the fitting areas as shown in FIG. 2h. After a fitting process has been performed on all target objects in the eye fundus medical image, labels in the eye fundus medical image may be extracted based on the resultant fitting areas, to obtain the image in which labels are extracted as shown in FIG. 2i. The circle center of a fitting area is the center of the fitting area, and the radius of a fitting circle is the radius of the fitting area, thereby coordinates relative to the center point of the fitting area, i.e., coordinate information of the border points, may be acquired. Then, the medical image in which coordinate information is extracted may be used for subsequent machine learning, so as to achieve the purpose of detecting lesions, e.g., eye fundus lesions.

A step 104 includes: extracting the label in the medical image by selecting, from the fitting areas, at least one fitting area matching a preset condition which is set based on characteristics of the fitting area. In some embodiments, at least one target fitting area matching the preset condition may be selected from the fitting areas in accordance with the long radius/short radius ratio or area/perimeter ratio of each fitting area and a nested fitting area in each fitting area. The nested fitting area refers to a fitting area completely within the range of another fitting area in the image.

In embodiments of the present disclosure, some noise points may be eliminated by thresholding according to the characteristics of the medical image. The preset condition may include a preset value of the long radius/short radius ratio or area/perimeter ratio of the fitting area. For example, if the long radius/short radius ratio of a fitting area is greater than a preset value of 3 or if the area/perimeter ratio of the fitting area is greater than a preset value of 800, the fitting area is mostly likely generated by noise points at the edge of eye ball rather than by lesion information. As a result, the fitting area may be deemed in disagreement with the preset condition and therefore should be eliminated. For another example, the preset condition may specify that the fitting area is not a nested fitting area. In this way, the target fitting area is selected by eliminating a fitting area nested in an outer fitting area while retaining the outer fitting area.

In an optional embodiment of the present disclosure, the step 104 may include: acquiring, according to the long radius/short radius ratios or area/perimeter ratios of the fitting areas, at least one first fitting area meeting a preset value of the long radius/short radius ratio or area/perimeter ratio from among the fitting areas.

The preset value may be set in advance according to actual requirements. The value may be set by any suitable means. The size of the value may be determined by experimentations or by the empirical approach.

When the preset condition is set based on the preset value of the long radius/short radius ratio, the long radius/short radius ratio of each fitting area may be compared with the preset value, so as to eliminate the fitting area which does not meet the preset value. For example, if the preset condition is that the long radius/short radius ratio is less than a preset value which is 3, then a fitting area with the long radius/short radius ratio larger than 3 does not meet the preset value and therefore is eliminated. As a result, the remaining fitting areas are the first fitting areas.

When the preset condition is set based on the preset value of the area/perimeter ratio, the area/perimeter ratio of each fitting area may be compared with the preset value, so as to eliminate the fitting area which does not meet the preset value. For example, if the preset condition is that the area/perimeter ratio is less than a preset value which is 800, then a fitting area with an area/perimeter ratio larger than 800 does not meet the preset value and therefore is eliminated. As a result, the remaining fitting areas are the first fitting areas.

It should be understood that, the above examples are only given to facilitate the understanding of the technical solutions of embodiments of the present disclosure, and the present disclosure is by no means limited thereto. In practice, a person skilled in the art may select any suitable value of the long radius/short radius ratios and/or area/perimeter ratios of the fitting areas at his discretion to determine the first fitting areas.

In addition, the step 104 may include: determining whether there is a nested fitting area in the first fitting areas.

After the first fitting areas meeting the preset value are acquired, it may be determined whether there is a nested fitting area in each first fitting area. If there is no nested fitting area in the each fitting area, each first fitting area is regarded as a target fitting area. If there is a nested fitting area in a first fitting area, the interior nested fitting area in the first fitting area is eliminated, to obtain the target fitting area.

For example, if there are a first fitting area A and a first fitting area B and the first fitting area B is inside the first fitting area A, i.e., the first fitting area B is completely within the range of the first fitting area A, then the first fitting area B is an interior area and thus is eliminated. The remaining first fitting area A is regarded as a target fitting area.

According to the method of extracting a label in a medical image provided by embodiments of the present disclosure, a specific labeled area (such as lesion site labeled by a doctor) may be extracted from the medical image by using edge detection, curve fitting as well as label color extraction. The extracted labeled lesion areas may be used for subsequent machine learning, so as to achieve the purpose of detecting lesions by using artificial intelligence (AI) techniques.

Figure 3:
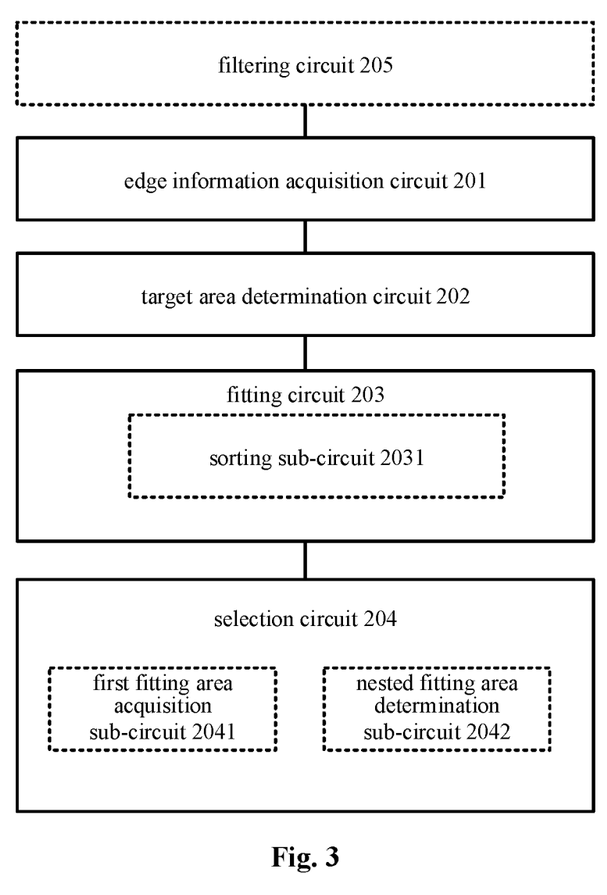
FIG. 3 illustrates a schematic structural diagram of a device of extracting a label in a medical image provided by embodiments of the present disclosure.

FIG. 3 illustrates a schematic structural diagram of a device of extracting a label in a medical image provided by embodiments of the present disclosure. The device may include: an edge information acquisition circuit 201, a target area determination circuit 202, a fitting circuit 203 and a selection circuit 204.

The edge information acquisition circuit 201 is configured to perform an edge detection on the medical image by using an edge detection algorithm, to acquire edge information in the medical image. The target area determination circuit 202 is configured to determine at least one target area defined by the edge information. The fitting circuit 203 is configured to perform a fitting process on the at least one target area, to obtain fitting area. The selection circuit 204 is configured to extract the label in the medical image by selecting, from the fitting areas, at least one target fitting area matching a preset condition which is set based on characteristics of the fitting area. The preset condition may be based on at least one of: a preset value of the long radius/short radius ratio of the fitting area, a preset value of the area/perimeter ratio of the fitting area, and the fitting area not being a nested fitting area.

Optionally, the device further includes: a filtering circuit 205, configured to filter the medical image, to obtain a filtered medical image. The edge information acquisition circuit 201 is configured to perform the edge detection on the filtered medical image.

Optionally, the target area determination circuit 202 is further configured to dilate the at least one target area defined by the edge information, and determine at least one dilated area as the at least one target area.

Optionally, the medical image is an eye fundus image. The edge information acquisition circuit is configured to employ two thresholds to perform the edge detection. The two thresholds include a first set threshold of 80 and a second set threshold of 150.

Optionally, the fitting circuit 203 further includes: a sorting sub-circuit 2031, configured to sort, based on the edge information, the at least one target area into categories corresponding to different lesion types in the medical image. The fitting circuit 203 is further configured to perform the fitting process on at least one target area of a same category, to obtain a fitting area of the category.

The sorting sub-circuit 2031 is further configured to acquire, according to the medical image, a color characteristic corresponding to the edge information of each of the at least one target area, and sort the at least one target area based on the color characteristic. For example, the target areas with the same color characteristic are sorted into a same category.

Optionally, the edge information includes edge coordinate information. The fitting circuit 203 is further configured to perform the fitting process on the edge coordinate information of the target areas (e.g., the target areas of the same category) by using an ellipse fitting method, to obtain the fitting areas.

Optionally, the selection circuit 204 includes: a first fitting area acquisition sub-circuit 2041, configured to acquire, according to a preset value of the long radius/short radius ratio or area/perimeter ratio of each of the fitting areas, at least one first fitting area meeting the preset value from the fitting areas; a nested fitting area determination sub-circuit 2042, configured to determine whether there is a nested fitting area in each of the first fitting areas; and a target fitting area acquisition sub-circuit, configured to, in case that there is a nested fitting area in the first fitting areas, eliminate the first fitting area in an inner layer of the nested fitting area, to obtain the target fitting areas.

According to the device of extracting a label in a medical image provided by embodiments of the present disclosure, a specific labeled area (such as a lesion site labeled by a doctor) may be extracted from the medical image by using edge detection, curve fitting as well as label color extraction. The medical image in which a lesion label is extracted may be used for subsequent machine learning, so as to achieve in the medical field the purpose of detecting lesions by using the AI techniques.

The embodiments of the present disclosure further disclose a storage medium storing therein computer instructions, the computer instructions are configured to be executed by a processor, to implement one or more steps of the method of extracting a label in a medical image according to any one of foregoing embodiments.

The embodiments of the present disclosure further disclose a computer equipment, including a memory, a processor and computer instructions stored in the memory, the processor is configured to execute the computer instructions, to implement steps of the method of extracting a label in a medical image according to any one of foregoing embodiments.

The processor may include a logic operation device has data processing and/or program executing capabilities, such as a central processing unit (CPU), field programmable gate array (FPGA), micro control unit (MCU), digital signal processor (DSP), application specific integrated circuit (ASIC) or graphic processing unit (GPU).

The computer instruction include one or more processor operations defined by instruction set architecture corresponding to the processor. These computer instructions may be included and represented logically by one or more computer programs.

It should be understood that, the extraction device may further be connected to various input devices (such as user interface, keyboard), output devices (such as speaker), display device and the like, to achieve the interaction between a computer product and other product or user.

In embodiments of the present disclosure, the connection, coupling, etc., may be achieved via a network, for example, a wireless network, a wired network and/or any combination of wireless network and wired network. The network may include: local area network (LAN), Internet, telecommunication network, Internet of Things based on Internet and/or telecommunication network, and/or any combination of the foregoing networks. The wired network may for example employ twisted pair cable, coaxial cable, fiber optic cable or the like to transmit signals. The wireless network may for example employ communication technologies such as 3G/4G/5G mobile communication network, Bluetooth, Zigbee or Wi-Fi.

It should be understood that, the aforementioned circuits, sub-circuits and blocks in accompanying block diagram are functional entities, and do not necessarily correspond to entities independent of each other physically or logically. These functional entities may be implemented in software, or one or more hardware modules or integrated circuits, or different networks and/or processing devices and/or microcontroller devices.

The exemplary implementations described herein may be implemented in software, or may be implemented in form of a combination of software and necessary hardware. Therefore, the technical solution according to the embodiments of the present disclosure may be embodied in form of a software product. The software product may be stored in a non-volatile storage medium (which may include compact disc read-only memory (CD-ROM), universal serial bus (USB) flash disk, mobile hard disk, hard disk drive, solid state disk or the like) or on a network, and includes instructions configured to be executed by a computing device (which may include personal computer, server, mobile terminal, network equipment or the like) to implement the method according to the embodiments of the present disclosure.

While, for purposes of simplicity of explanation, the methodology embodiments described are shown as a series of actions, it is to be appreciated by a person skilled in the art that the present disclosure is not limited by the order of the actions, as some steps may, in accordance with the present disclosure, occur in different orders or concurrently. Moreover, it is to be appreciated by a person skilled in the art that the embodiments described in the specification are optional, and not all illustrated actions and modules may be required to implement the disclosure.

The embodiments provided in the specification are described in a progressive manner and the description of each embodiment focuses on its difference from other embodiments, thus the same or similar part among various embodiments may be referred with each other.

It should be further noted that in this specification, relational terms such as first and second are only used to distinguish one entity or operation from another, and do not necessarily require or imply that any of these relationships or sequences actually exists between these entities or operations. Moreover, terms "comprise," "include," "have," and any variations thereof in this disclosure are intended to cover a non-exclusive inclusion meaning, such that a process, a method, an article, or a device that includes a list of elements not only includes the list of elements, but also may include other elements not expressly listed or include elements inherent to the process, the method, the article, or the device. An element preceded by "includes or including", without further limitations, does not preclude existence of additional identical elements in the process, the method, the article, or the device including the element.

A method and a device of extracting a label in a medical image provided by the present disclosure are described above in detail. The principle and implementations of this disclosure are set forth by means of specific examples, and the above descriptions of embodiments are merely for the purpose of facilitating the understanding of the method of the present disclosure and its core concept; further it is appreciated that modifications may be made in the specific implementations and range of application thereof by a person of ordinary skill in the art according to the principle of the present disclosure. In summary, the content of the specification should not be construed as a limitation of the present disclosure.

What is claimed is:

1. A method of extracting a label in a medical image, comprising:
    performing an edge detection on the medical image by using an edge detection algorithm, to acquire edge information in the medical image;
    determining at least one target area defined by the edge information;
    performing a fitting process on the determined at least one target area, to obtain at least one fitting area; and
    extracting the label in the medical image by selecting, from the fitting areas, at least one target fitting area matching a preset condition, wherein the preset condition is set based on a characteristic of the fitting area, wherein performing the fitting process on the determined at least one target area comprises:
    sorting the at least one target area into categories corresponding to different lesion types in the medical image; and
    performing the fitting process on the at least one target area of a same category, to obtain the fitting area of the category.

2. The method according to claim 1, wherein
    before performing the edge detection on the medical image by using the edge detection algorithm, the method further comprises: filtering the medical image, to obtain a filtered medical image; and
    the edge detection is performed on the filtered medical image.

3. The method according to claim 1, wherein determining the at least one target area defined by the edge information comprises:
    dilating the at least one area defined by the edge information, and determining the dilated at least one area as the at least one target area.

4. The method according to claim 1, wherein the medical image is an eye fundus image, and the edge detection algorithm employs two thresholds for detection.

5. The method according to claim 4, wherein the two thresholds comprise a first set threshold of 80 and a second set threshold of 150.

6. The method according to claim 1, wherein lesions of different natures are labeled with different colors in the medical image, and sorting the at least one target area into categories further comprises:
    acquiring a color characteristic corresponding to the edge information of each of the at least one target area; and
    sorting the at least one target area into the categories based on the color characteristic.

7. The method according to claim 1, wherein a lesion in the medical image is labeled with an ellipse, the edge information comprises edge coordinate information, and performing the fitting process on the determined at least one target area comprises:
    performing an ellipse fitting process on the edge coordinate information of the determined at least one target area, to obtain the fitting area.

8. The method according to claim 1, wherein the preset condition is based on at least one of:
    a preset value of a long radius/short radius ratio of the fitting area;
    a preset value of an area/perimeter ratio of the fitting area; and
    the fitting area not being a nested fitting area.

9. A device for extracting a label in a medical image, comprising a memory, a processor and a computer instruction stored in the memory, wherein the processor is configured to execute the computer instruction, to implement steps of:
    performing an edge detection on the medical image by using an edge detection algorithm, to acquire edge information in the medical image;
    determining at least one target area defined by the edge information;
    performing a fitting process on the determined at least one target area, to obtain at least one fitting area; and
    extracting the label in the medical image by selecting, from the fitting areas, at least one target fitting area matching a preset condition, wherein the preset condition is set based on a characteristic of the fitting area, wherein performing the fitting process on the determined at least one target area comprises:

sorting the at least one target area into categories corresponding to different lesion types in the medical image; and performing the fitting process on the at least one target area of a same category, to obtain the fitting area of the category.

10. The device according to claim 9, wherein the processor is further configured to:

filter the medical image, to obtain a filtered medical image, wherein the edge information acquisition circuit is configured to perform the edge detection on the filtered medical image.

11. The device according to claim 9, wherein the processor is further configured to dilate the at least one area defined by the edge information, and determine the dilated at least one area as the at least one target area.

12. The device according to claim 9, wherein the medical image is an eye fundus image, and the processor is configured to employ two thresholds to perform the edge detection.

13. The device according to claim 12, wherein the two thresholds comprise a first set threshold of 80 and a second set threshold of 150.

14. The device according to claim 9, wherein different types of lesions are labeled with different colors in the medical image, and the processor is further configured to acquire a color characteristic corresponding to the edge information of each of the at least one target area, and sort the at least one target area into the categories based on the color characteristic.

15. The device according to claim 9, wherein a lesion in the medical image is labeled with an ellipse, the edge information comprises edge coordinate information, and the processor is configured to perform an ellipse fitting process on the edge coordinate information of the at least one target area, to obtain the fitting area.

16. The device according to claim 9, wherein the preset condition is based on at least one of:

a preset value of a long radius/short radius ratio of the fitting area;

a preset value of an area/perimeter ratio of the fitting area; and the fitting area not being a nested fitting area.

17. A non-transitory storage medium storing therein a computer instruction, wherein the computer instruction is configured to be executed by a processor, to implement one or more steps of the method of extracting the label in the medical image according to claim 1.

* * * * *